United States Patent [19]
Van Der Bel

[11] Patent Number: 6,120,161
[45] Date of Patent: Sep. 19, 2000

[54] VIDEO HEADLIGHT AND CABLE

[75] Inventor: Frans G. Van Der Bel, Southbridge, Mass.

[73] Assignee: Techman International Corporation, Charlton City, Mass.

[21] Appl. No.: 09/286,059

[22] Filed: Apr. 5, 1999

Related U.S. Application Data

[60] Provisional application No. 60/081,029, Apr. 8, 1998.

[51] Int. Cl.[7] ............................. F21V 21/084; A61B 1/06
[52] U.S. Cl. ........................... 362/105; 362/106; 362/572
[58] Field of Search .................................... 362/105, 106, 362/570, 572, 573, 574, 581, 582, 804; 600/249; 128/18, 22, 23

[56] References Cited

U.S. PATENT DOCUMENTS

| | | | |
|---|---|---|---|
| 4,616,257 | 10/1986 | Kloots et al. | 362/105 |
| 4,797,736 | 1/1989 | Kloots et al. | 362/33 |
| 5,430,620 | 7/1995 | Li et al. | 362/804 |

*Primary Examiner*—Y. Quach
*Attorney, Agent, or Firm*—Blodgett & Blodgett, P.C.

[57] ABSTRACT

A video headlight and fiberoptic cable which includes a light and camera assembly adjustably mounted on a headband for assuming a plurality of angular positions relative to the headband. The light and camera assembly includes a light unit closely positioned relative to a video camera unit so that the visual field of the camera unit lies within the lighted field from the light unit in all adjusted positions of the light and camera assembly. The light unit is connected to the forward end of the fiberoptic cable. The rearward end of the fiberoptic cable is connectable to a source of light. The one end of the fiberoptic cable has a flexible, but non-collapsible coupler which bends uniformly when the light and camera assembly is moved relative to the headband.

11 Claims, 5 Drawing Sheets

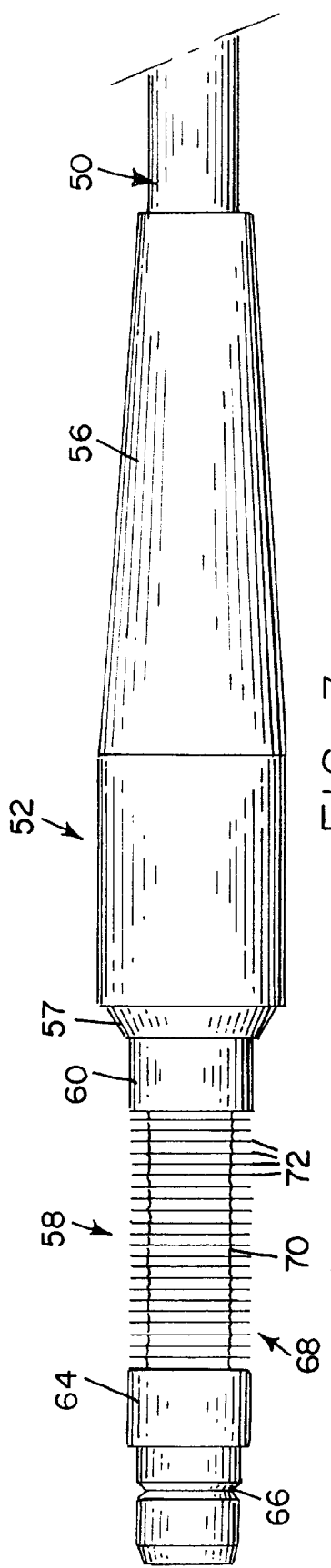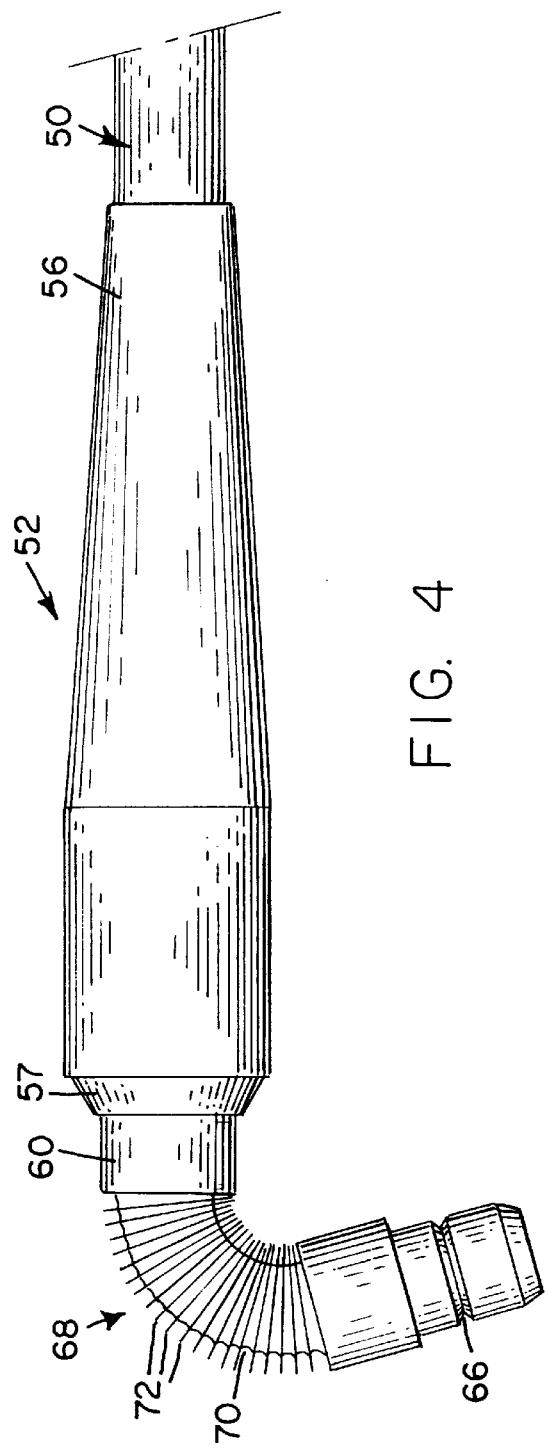
FIG. 3
FIG. 4

VIDEO HEADLIGHT AND CABLE

CROSS-REFERENCE TO RELATED APPLICATIONS

This application claims the benefit under 35 U.S.C. §119 (e) of prior U.S. Provisional Application Ser. No. 60/081,029 filed Apr. 8, 1998; all of which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is generally directed to a video monitoring system apparatus and specifically directed to a video monitoring apparatus which employs a small video camera and light adjustably mounted on a headband and connected to a remote monitoring system by fiberoptic cable. Headbands equipped with video instruments are used extensively in the medical field for examinations and operations.

Current video headlight devices, some with microphone attachments, are employed so that the wearer can maintain a video record of an entire procedure for both teaching and litigation protection purposes. The video attachments, hitherto available, position the video camera adjacent to the headlight output lens, i.e. on separate axes from one another. The resulting parallax ensures that the camera's field of view and the illumination spot will mutually coincide at a fixed distance from the surgeon's head but progressively diverge as the surgeon's head moves closer to or further away from the present distance.

Fiberoptic cables for the illumination of surgical instruments, headlights, and microcopies are usually comprised of a silicone or other flexible jacket surrounding the optical fibers, with metallic ferrules at both ends to connect the cable to a light source and the appropriate surgical device.

One of the drawbacks of the compliant fiberoptic cable jacket or sheath has been its tendency to collapse under tight bending situations, so that the entrained optical fibers are pinched and strained to the breaking point, thus degrading their function. In the past, the solution to the problems arising from tight cable bends which are usually required adjacent to one or the other of the cable's ends, has been to replace the conventional right cylindrical metallic connector ferrule with a purposely bent metallic ferrule which will accomplish the desired cable bend angle while protecting the entrained fiberoptics from "pinch" damage.

The difficulty arising from this solution is that a multiplicity of cable ferrule designs must be kept on hand and the cables exchanged whenever the curvature requirement is changed. For example, a surgical headlight in the Direct mode will generally require the standard right cylindrical ferrule connector, but the Coaxial mode will cause the cable either to stand well of the wearer's head, so that it can interfere with other operative participants, or else be forced back close to the profile of the headlight and so run the risk of collapse and fiberoptic pinching. In the Coaxial case, therefore, it is expedient to employ the curved ferrule connected cable, thus provoking a laborious cable exchange. This procedure also incurs the expense of a separate cable.

These and other difficulties experienced with the prior art video headlight and cable devices have been obviated by the present invention.

It is, therefore, a principal object of the present invention to provide a video headlight apparatus which would substantially eliminate the parallax-distance variable.

A further object of the present invention is the provision of a video headlight apparatus in which the illumination area is always substantially coaxial with the camera's field of view.

Another object of the present invention is to provide a fiberoptic cable connection for a video headlight system which is bendable without creating a kink in the optical fibers within the cable or otherwise damaging the fibers.

A still further object of the invention is the provision of a hermetically sealed fiberoptic cable connection for a video headlight system which is flexible but non-collapsible and enables the video camera and light to be moved at any angular position within a relatively wide range of angles.

Another object of the invention is the provision of a fiberoptic video camera apparatus which is versatile, reliable, easy to use and capable of extension use without damaging the optical fibers with the fiberoptic cable which is connected to the video camera.

With these and other objects in view, as will be apparent to those skilled in the art, the invention resides in the combination of parts set forth in the specification and covered by the claims appended hereto.

BRIEF SUMMARY OF THE INVENTION

A video headlight and fiberoptic cable which includes a light and camera assembly adjustably mounted on a headband for assuming a plurality of angular positions relative to the headband. The light and camera assembly includes a light unit closely positioned relative to a video camera unit so that the visual field of the camera unit lies within the lighted field from the light unit in all adjusted positions of the light and camera assembly. The light unit is connected to the forward end of the fiberoptic cable. The rearward end of the fiberoptic cable is connectable to a source of light. The one end of the fiberoptic cable has a flexible, but non-collapsible coupler which bends uniformly when the light and camera assembly is moved relative to the headband to prevent the optical fibers within the cable from being damaged or kinking.

BRIEF DESCRIPTION OF THE DRAWINGS

FIG. 3 is an enlarged view of the connector portion of the fiberoptic cable showing the connector in an unbent state;

FIG. 4 is a view similar to FIG. 3 showing the connector in a bent state;

DETAILED DESCRIPTION OF THE INVENTION

Figure 1:
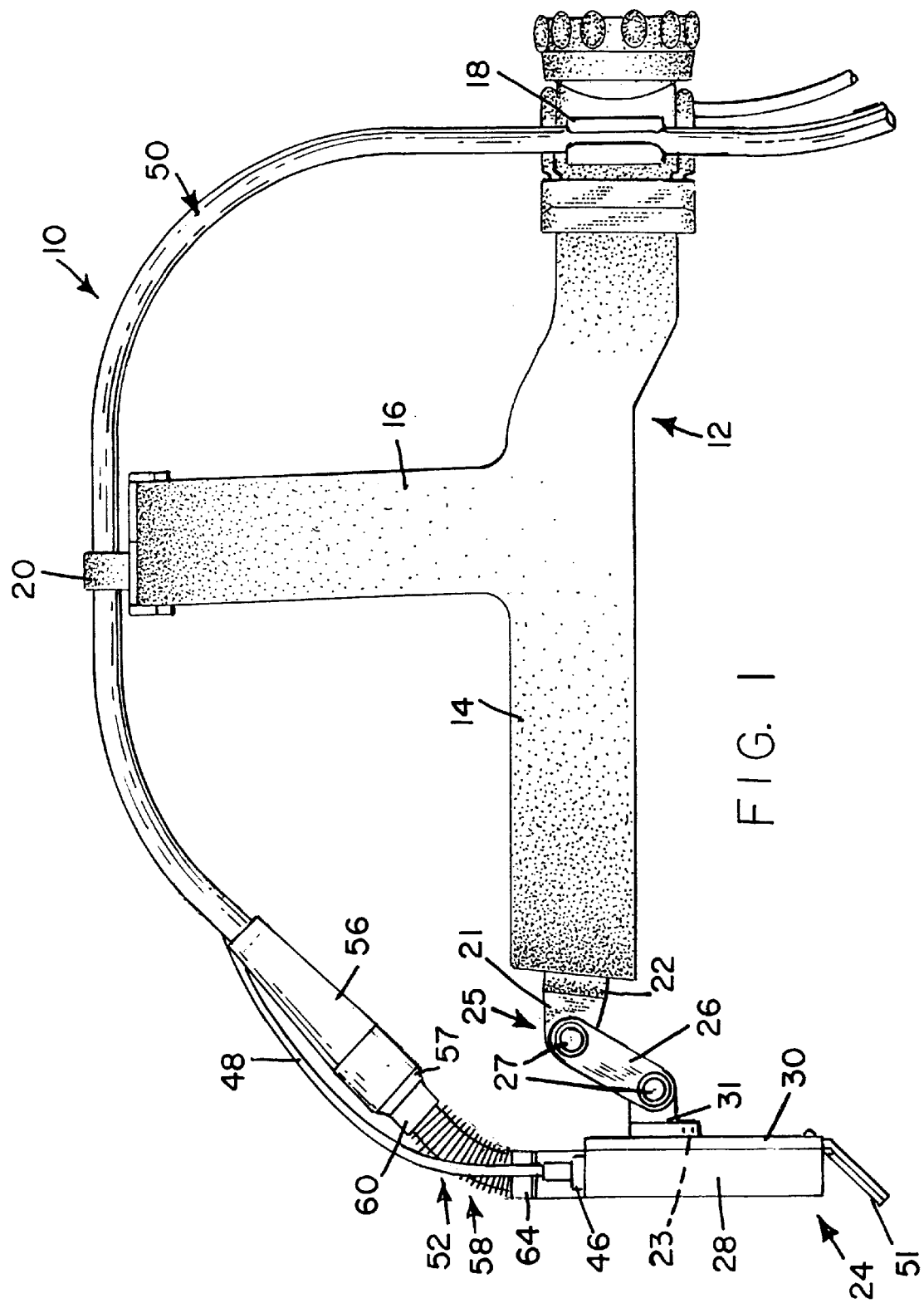
FIG. 1 is a side elevational view of a video headlight and fiberoptic cable apparatus embodying the principles of the present invention.

Referring to FIG. 1, the video monitoring apparatus of the present invention is generally indicated by the reference numeral 10 and includes a headband, generally indicated by the reference numeral 12, a light and camera assembly, generally indicated by the reference numeral 24, and a fiberoptic connector assembly, generally indicated by the reference numeral 52.

The headband 12 comprises a circular horizontal portion 14 and an upwardly extending vertical portion 16. A U-shaped clip 18 is located at one side of the headband 14 near the rear end of the band. A similar clip, not shown, is located at the opposite side of the band 14. A pair of clips 20 is located at the top of the vertical portion 16. A mounting bracket 22 is fixed to the forward surface of the band 14.

Figure 6:
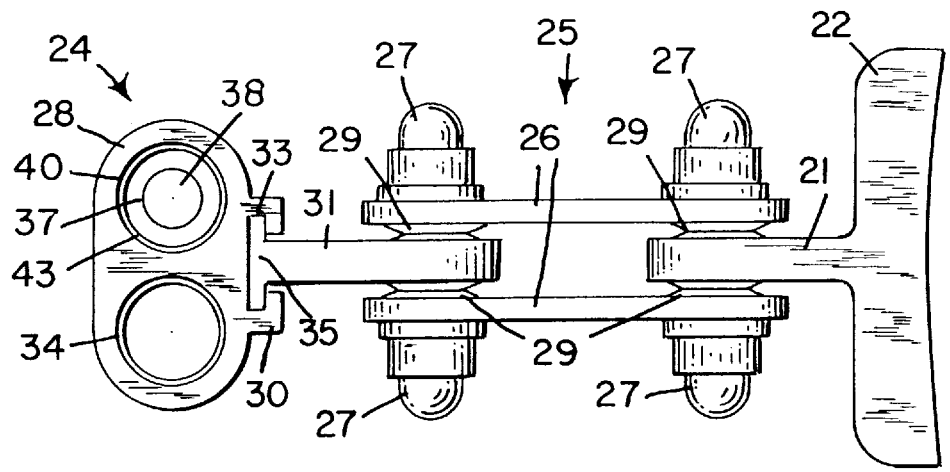
FIG. 6 is a top plan view of the housing for the light and camera and means for supporting the headband.
Figure 7:
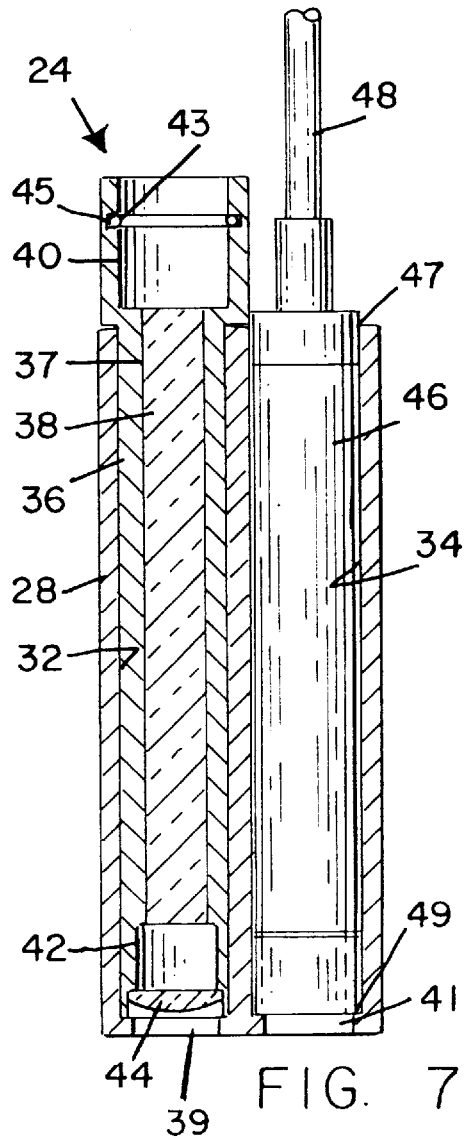
FIG. 7 is a longitudinal cross-sectional view of the housing.

Referring to FIGS. 1, 6 and 7, the light and camera assembly 24 includes a housing 28 that has a first bore 32 and a second bore 34 located parallel to the first bore 32. The first bore 32 has a bottom opening 39. The light pipe 36 is located within the bore 32. The light pipe 36 contains a central elongated bore 37 which contains a glass rod 38. The light pipe 36 has an upper counterbore 40 and a lower counterbore 42. A spring-like retaining ring 43 is located within an annular bore 45 in the inner surface of the upper counterbore 40. The counterbore 40 and retaining ring 43 constitutes a coupling fixture for receiving the fiberoptic connector assembly 52. A lens 44 is located in the lower counterbore 42 just above the bottom opening 39 and is spaced from the lower end of the glass rod 38. The bore 34 contains a removable CCD video camera 46. The camera 46 is a miniature camera such as Model 1K-M43A, manufactured by Imaging Systems Division of Toshiba America Information Systems, Inc. The bore 34 has an upper opening 47 and a lower opening 41. The camera 46 is inserted into the bore 34 through the upper opening 47 and comes to rest on an annular ridge 49 just above the lower opening 41. The camera 46 is connected to a video cord 48 which is supported on the headband 12 by one of the clips 20 at the top of the headband and by one of the clips 18 at the rear portion of the headband. An optional mirror 51 is removably connected to the lower and rearward end of the housing 28 so that it extends forwardly at an angle just below the lower openings 41 and 39. The lower openings 41 and 39 are at substantially the same level or in the same horizontal plane.

The rear portion of the housing 28 has an elongated mounting bracket 30 which contains a rearwardly facing vertical T-shaped groove 33. The housing 28 is adjustably supported on the mounting bracket 22 by as connecting assembly, generally indicated by the reference numeral 25. The connecting assembly 25 includes a pair of parallel links 26 and a coupler 31. The links 26 are pivotally connected at one end to a forward shaft. A forwardly extending arm portion 21 of the mounting bracket 22 is also pivotally connected to the rearward shaft between the links 26. The rearward end of coupler 31 is pivotally connected to the forward shaft between the links 26. The forward end of the coupler 31 has a T-shaped configuration and is slidably mounted within the T-shaped groove 33. The coupler 31 can be locked in any desired vertical position along the groove 33 by a set screw 23. The links 26 are maintained on the forward and rearward shafts by cap nuts 27 which are threaded onto the outer ends of the forward and rearward shafts. Spring-like washer couplings between the Links 26 and each of the arm portion 23 and the coupler 31 maintain the links 26 in any desired pivoted orientation.

Referring to FIGS. 2–5, a fiberoptic cable 50 is removably connected to the housing 24 by the fiberoptic connector assembly 52. The connector assembly 52 includes an inner metallic sleeve 54 located within an outer elastomeric sleeve 56 for clamping therebetween one end of the outer elastomeric sheath 53 of the fiberoptic cable 50. The outer end of the inner sleeve 54 has internal threads 55. A flexible coupler, generally indicated by the reference numeral 58, includes an outer tubular head portion 64, an inner tubular head portion 60, and a metal bellows portion, generally indicated by the reference numeral 68, located between the head portions 64 and 60. One end of the bellows 68 is fixed to the outer head portion 64 and the opposite end of the bellows 68 is fixed to the inner head portion 60. The inner head portion 60 has external threads 62 for engaging the internal threads 55 of the inner sleeve 54 to enable the head portion 60 to be screwed into the inner sleeve. A washer 57 is located between the outer end of the inner sleeve 54 and a shoulder 59 on the inner head portion 60. The outer head portion 64 has an outer annular groove 66. A ferrule 74 is located within the outer head portion 64. The metal bellows 68 has a flexible cylindrical tubular wall 70 and a plurality of spaced annular fins or convolutions 72 extending outwardly from the wall 70.

Figure 2:
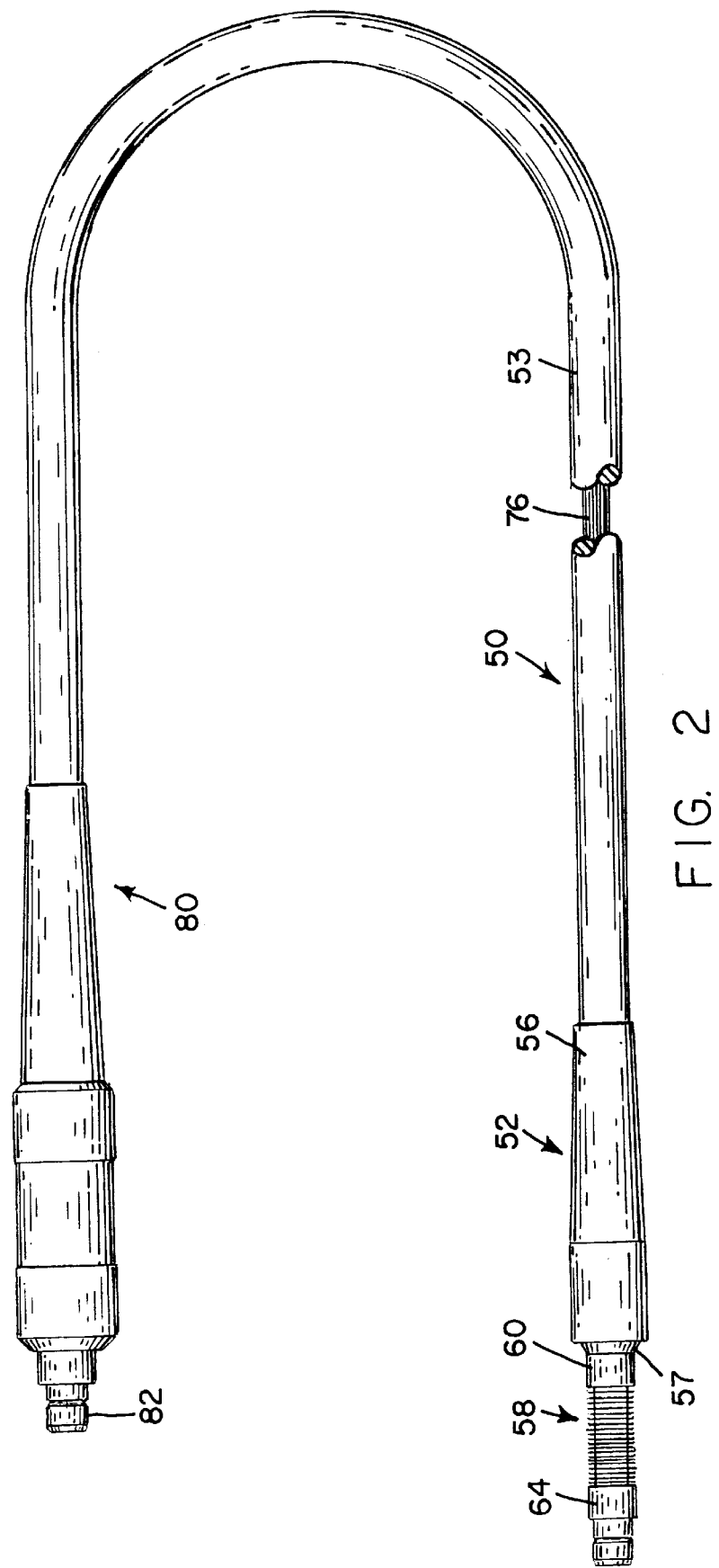
FIG. 2 is a plan view of the fiberoptic cable and connector for the video headlight system of the present invention.
Figure 5:
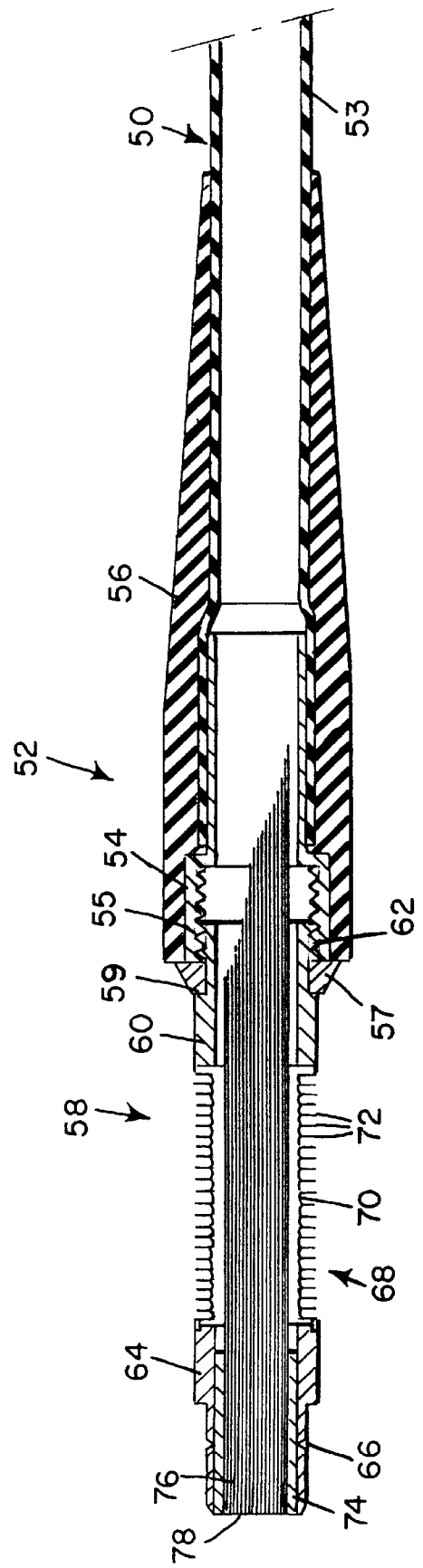
FIG. 5 is a longitudinal cross-sectional view of the connector.

Referring particularly to FIG. 2, the opposite end of the fiberoptic cable 50 is connected to a connector assembly, generally indicated by the reference numeral 80. The outer end of the connector assembly 80 includes a tubular outer head portion 82 which contains a ferrule similar to the ferrule 74 for holding the forward ends of a plurality of optical fibers 76. The head portion 82 is adapted to be inserted into a light source, not shown. The optical glass fibers 76 extend from a fixed position from the ferrule within the head portion 82 freely within the sheath 53 for the length of the cable 50. The fibers extend freely through the inner sleeve 54, the inner tubular head portion 60 and the metal bellows 68 and into the ferrule 74. The outer ends of the fibers 76 are held firmly in the ferrule 74. The outer terminal ends of the fibers 76 form an outer light transmitting surface 78 at the outer end of the outer head portion 64. The head portion 64 is adapted to be inserted into the counterbore 40 so that the lock ring 43 engages the inner groove 66. The head portion 64 is, thereby, yieldably locked within the counter bore 40 so that the light transmitting surface 78 is aligned with the upper end surface of the glass rod 38. Light from a light source is, thereby, transmitted through the fiberoptic cable 50 from the head portion 82 to the outer head portion 64 and to the lens 44 through the glass rod 38. The lens 44 focuses a beam of light through the lower opening 39 to a viewing field below the light and camera assembly 24. The beam of light from the lower opening 39 has a downwardly expanding conical shape. The visual field of the camera 46 has a downwardly expanding conical shape which overlaps the beam of light. The optimum effective range of the beam of light and the visual field is from 12" to 24" from the lower openings 39 and 41.

The light and camera assembly 24 can be adjusted vertically relative to the coupler 31. The connector assembly 25 enables the assembly 24 to be adjusted in a multiplicity of orientations within a vertical plane which bisects the coupler 31. This enables the user of the video monitoring apparatus 10 to illuminate and monitor a work area forward and downward of the user. The optional mirror 51 enables the use to illuminate and view an area which faces downwardly. The bellows 68 enables the light and camera assembly 24 to bend relative to the central longitudinal axis of the outer coupling sleeve 56 without damaging the optical fibers 76 or creating a bending kink in the fibers. The fins 72 cause the bellows 68 to bend in a gradual uniform curve from the co-axial position shown FIG. 3 to the fully bend position shown in FIG. 4. The adjustable features of the light and camera assembly 24 enable both the camera and light to be placed at the same angle while illuminating the field of observation such as surgery area and allowing the camera to have an unobstructed view of the observation field which is the same as that of the wearer of the video monitoring apparatus. The present invention eliminates the need for a complex array of prisms, optics and a beam splitter, which the past were necessary to produce an unobstructed and accurate view of an area such as a surgical field at the video monitor. The present design eliminates back scatter light and bright spots which in past systems produce a deterioration of the video image. Preferably, the bellows 68 is made of stainless steel or a nickel plated steel and is capable of being hermetically sealed between the ferrule connections at each end of the optical cable. The metal bellows 68 is flexible, but non-collapsible. The bellows 68 functions like a spring, wherein it is biased to its coaxial straight configuration as shown in FIG. 3.

What is claimed is:

1. A headlight comprising:
   (a) a headband adapted to fit snugly on a human head above the eyes, said headband having a forward end and a rearward end;
   (b) a light assembly adjustably mounted on the forward end of said headband, said light assembly having an upper end and a lower end;
   (c) a fiberoptic cable mounted on said headband, said fiberoptic cable having a forward end and a rearward end, said rearward end being adapted to be coupled to a light source, said fiberoptic cable comprising an elastomeric sheath having a forward end and at least one optical fiber enclosed within said elastomeric sheathe said optical fiber having a forward end which extends forwardly of the forward end of said elastomeric sheath;
   (d) a coupler comprising:
      (1) a forward end adapted to be removably coupled to said light assembly, the forward end of said coupler having a forward bore, the forward end of said optical fiber being located within said forward bore and fixed to the forward end of said coupler;
      (2) a rearward end coupled to the forward end of said elastomeric sheath, the rearward end of said coupler having a rearward bore; and
      (3) a flexible middle portion located between the forward end of said coupler and the rearward end of said coupler and fixed to each of the forward and rearward ends of said coupler, said flexible middle portion having a middle bore, the forward end of said optical fiber extending freely through said rearward and middle bores.

2. A headlight as recited in claim 1, wherein said flexible middle portion is a metal bellows which assumes a uniform curve when bent.

3. A headlight as recited in claim 2, wherein said metal bellows comprises a cylindrical wall and a plurality of spaced annular fins extending outwardly from said cylindrical wall.

4. A headlight as recited in claim 3, wherein said metal bellows is normally straight and assumes a uniform curve when a bending force is applied to said bellows, said bellows being resilient so that the bellows returns to its normal straight shape upon the removal of said bending force.

5. A headlight as recited in claim 1, wherein the forward end of said optical fiber is fixed to said forward end of the coupler by means of a ferrule located between the forward end of said optical fiber and said forward end of the coupler.

6. A headlight as recited in claim 1, wherein the forward end of said fiberoptic cable comprises:
   (a) an outer elastomeric sleeve surrounding said elastomeric sheath; and
   (b) an inner metallic sleeve within said elastomeric sheath, said optical fiber extending freely through said inner metallic sleeve, said inner metallic sleeve being adapted to be removably coupled to rearward end of the coupler.

7. A headlight as recited in claim 6, wherein said rearward end of the coupler has external threads and said inner metallic sleeve has internal threads for engaging said external threads.

8. A headlight as recited in claim 1, wherein said light assembly comprises:
   (a) a housing having a first substantially vertical bore and a second substantially vertical bore substantially parallel to said first bore, each of said first and second bores having an upper opening and a lower opening, said housing having a coupling fixture above the upper opening of said first bore for being coupled to the forward end of said coupler;
   (b) a lens in said first bore adjacent the lower opening of said first bore;
   (c) a light transmitting rod located in said first bore and extending from said lens to the upper opening of said first bore for projecting a beam of light through said lens and the lower opening of said first bore, said beam of light expanding downwardly from the lower opening of said first bore; and
   (d) a miniature CCD video camera in said second bore for receiving light images from below the lower opening of said second bore, the visual field of said camera expanding downwardly from the lower opening of said second bore and overlapping said beam of light.

9. A headlight as recited in claim 8, wherein the lower openings of said first and second bores are substantially horizontally aligned and the optimum effective range of each of said beam of light and the visual field of said camera is from 12" to 24" from said lower openings.

10. A headlight comprising:
   (a) a headband adapted to fit snugly on a human head above the eyes, said headband having a forward end and a rearward end;
   (b) a light and camera assembly adjustably mounted on the forward end of said headband, said light assembly comprising:
      (1) a housing having a first substantially vertical bore and a second substantially vertical bore substantially parallel to said first bore, each of said first and second bores having an upper opening and a lower opening, said housing having a coupling fixture above the upper opening of said first bore;
      (2) a lens in said first bore adjacent the lower opening of said first bore;
      (3) a light transmitting rod located in said first bore and extending from said lens to the upper opening of said first bore for projecting a beam of light through said lens and the lower opening of said first bore, said beam of light expanding downwardly from the lower opening of said first bore; and
      (4) a miniature CCD video camera in said second bore for receiving light images from below the lower opening of said second bore, the visual field of said camera expanding downwardly from the lower opening of said second bore and overlapping said beam of light;

(c) a fiberoptic cable mounted on said headband, said fiberoptic cable having a forward end and a rearward end, the rearward end of said fiberoptic cable being adapted to be coupled to a light source, the forward end of said fiberoptic cable being adapted to be coupled to said coupling fixture; and (d) a video cord mounted on said headband and connected to said video camera.

11. A headlight as recited in claim 10, wherein the lower openings of said first and second bores are substantially horizontally aligned and the optimum effective range of each of said beam of light and the visual field of said camera is from 12" to 24" from said lower openings.

\* \* \* \* \*